Patented Mar. 4, 1952

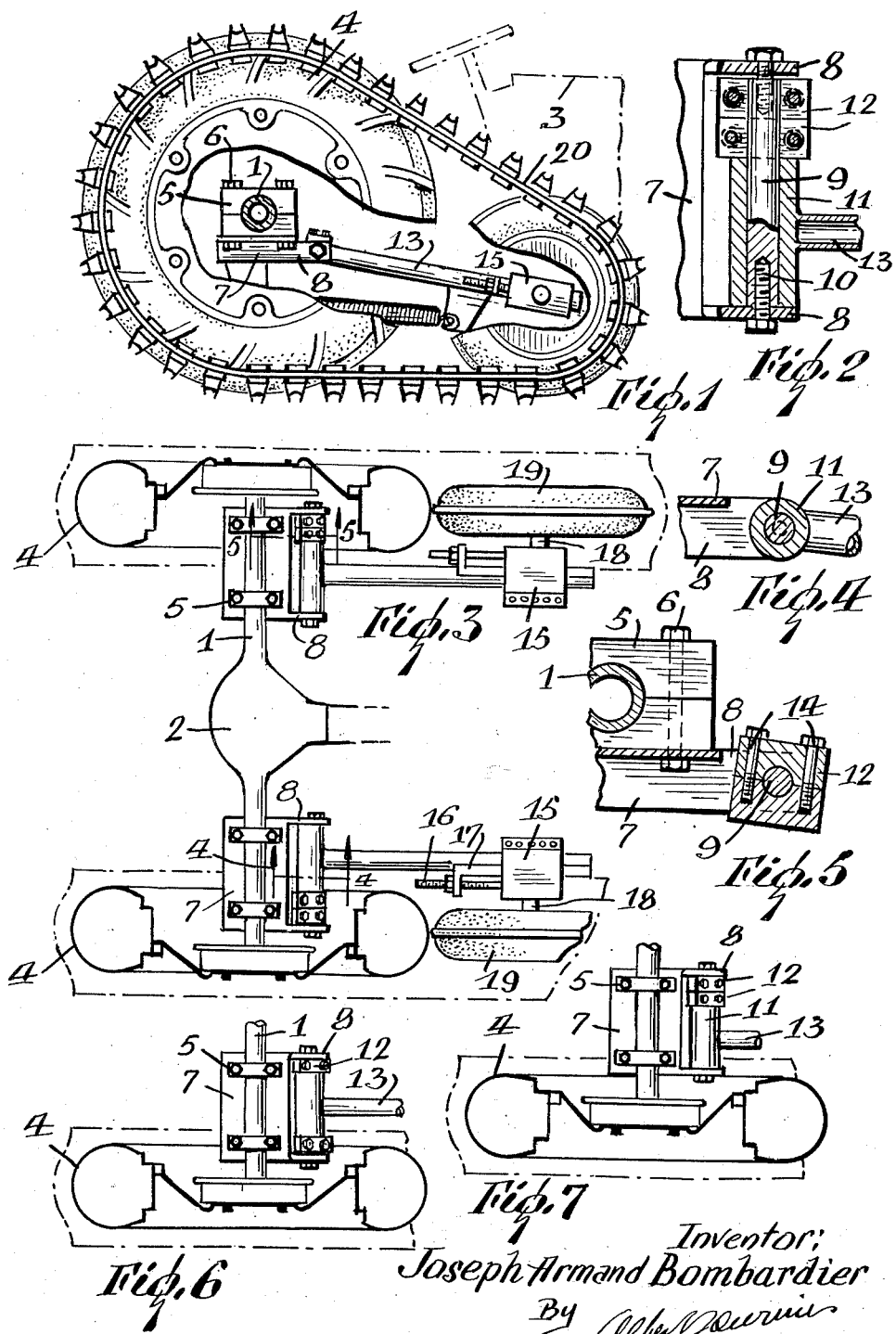

2,587,813

UNITED STATES PATENT OFFICE 2,587,813

TRACTOR UNIT

Joseph Armand Bombardier, Valcourt, Quebec, Canada

Application December 15, 1949, Serial No. 133,079

5 Claims. (Cl. 305—8)

The present invention pertains to a tractor unit designed for attachment to a vehicle to be propelled. The unit is of the type embodying endless belts or tracks, one at each side of the unit.

It has been found in practice that it is desirable to have a choice of three different spacings between track centers. One or another of these sizes is preferred by the user either at the time of original purchase or in adapting the machine for various jobs.

The principal object of the invention is to provide a tractor unit capable of such adjustment of the track center distance. Another object is to provide a construction wherein the adjustment requires no special tools or spare parts.

In the accomplishment of these objects, the axle of the unit carries a swivelled member at each end. The wheel at the end is normally adjustable lengthwise of the axle as known in the art, as for example in the patent to Munson, 1,451,627. The swivelled member is formed with or carries a U-shaped member in which is mounted a stub shaft.

On the stub shaft is mounted a slidable sleeve and a pair of removable collars, and from the sleeve extends the arm that carries the front wheel. By positioning the collars at one or the other end or at both ends of the sleeve, the distance of the front wheel from the longitudinal axis of the unit is adjusted, thereby adjusting the track spacing as set forth.

The invention is fully disclosed by way of example in the following description and in the accompanying drawings in which:

Figure 1 is a side elevation of the tractor, partly broken away;

Figure 2 is a detail section;

Figure 3 is a plan view;

Figures 4 and 5 are detail sections on the lines 4—4 and 5—5 of Figure 3; and

Figures 6 and 7 are detail elevations showing different adjustments.

Reference to these views will now be made by use of like characters which are employed to designate corresponding parts throughout.

In several of the figures is shown the rear axle 1 of a tractor unit, with a driving assembly 2 geared thereto. The tractor unit propels a suitable vehicle 3, as known in the art. The axle carries rear wheels 4, and the unit also includes forward wheels that will presently be described. The invention resides in the means for positioning and carrying the front wheels.

On each end of the axle 1 is mounted a pair of blocks 5 to which is secured by bolts 6, a U-shaped member 7 having a pair of forwardly extending spaced fingers 8. Between the fingers is mounted a stub shaft 9 held by a pair of screws 10 at the ends. On each shaft 9 is rotatably mounted a sleeve 11 and a pair of removable collars 12, and an arm 13 extends from each sleeve for carrying a forward wheel. The collars are split as shown in Figure 5, and the sections thereof are secured together by screws 14. Thus, the collars are removable and may be positioned differently on the shaft 9 for a purpose that will presently be described.

Each of the arms 13 carries a bearing block 15 adjustable by means of a screw 16 extending therefrom through a bracket 17 fixed on the arm. Each block 15 carries a trunnion 18 on which is mounted a front wheel 19. At each side of the tractor unit, a track 20 passes over a wheel 4 and a wheel 19.

The arrangements of the sleeve 11 and collars 12 provides for various widths of tread gauges, as shown in Figures 3, 6 and 7. In each case the track is centered on the rear wheel 4. The wheel is adjustable toward and from the axle 2 by means already known in the art. It then becomes necessary to adjust the wheels 19 correspondingly.

This adjustment is accomplished by the setting of the collars 12. In Figure 3 both collars are at the outer end of the sleeve 11, thereby affording the minimum center distance between the tracks. In Figure 6 there is a collar at each end of the sleeve to provide a larger center distance between the tracks. Finally in Figure 7 both collars are at the inner end of the sleeve for the maximum center distance. In practice the center distances may be 52", 56" and 60" respectively. These are the three sizes most preferred by the users.

It is apparent that no special tools or spare parts need be carried to change from one spacing to another according to the needs of the purchaser on the service to which the traction unit is put.

Although a specific embodiment of the invention has been illustrated and described, it will be understood that various alterations in the details of construction may be made without departing from the scope of the invention as indicated by the appended claims.

What I claim is:

1. A tractor unit adjustable to various tread gauges, comprising an axle, a wheel thereon, a U-shaped member fixed on said axle, a stub shaft fixed in said member, a slidable sleeve and a pair of removable collars on said shaft and substantially filling the space between the sides of said member, an arm extending radially from said sleeve, and a wheel supported by said arm, the last named wheel being free for lateral adjustment with said arm.

2. A tractor unit adjustable to various tread gauges, comprising an axle, a wheel thereon, a U-shaped member fixed on said axle, a stub shaft fixed in said member, a slidable sleeve and a pair of removable collars on said shaft and substantially filling the space between the sides of said member, an arm extending radially from said sleeve, a bearing block on said arm, a trunnion in said block, and a wheel on said trunnion, the last named wheel being free for lateral adjustment with said arm.

3. A tractor unit adjustable to various tread gauges, comprising an axle, a wheel thereon, a pair of clamp blocks having a swivel mounting on said axle, a U-shaped member fixed to one of said blocks, a stub shaft fixed in said member, a slidable sleeve and a pair of removable collars on said shaft and substantially filling the space between the sides of said member, an arm extending radially from said sleeve, and a wheel supported by said arm, the last named wheel being free for lateral adjustment with said arm.

4. A tractor unit adjustable to various tread gauges, comprising an axle, a wheel thereon, a pair of clamp blocks having a swivel mounting on said axle, a U-shaped member fixed to one of said blocks, a stub shaft fixed in said member, a slidable sleeve and a pair of removable collars on said shaft and substantially filling the space between the sides of said member, an arm extending radially from said sleeve, a bearing block on said arm, a trunnion in said block, and a wheel on said trunnion, the last named wheel being free for lateral adjustment with said arm.

5. A tractor unit adjustable to various tread gauges, comprising an axle, a wheel thereon, a swivel assembly on said axle, an arm extending transversely of said axle and having at one end a swivel mounting on said assembly, means for adjusting the swivelled end of said arm lengthwise of said axle, and a wheel supported by said arm, the last named wheel being free for lateral adjustment with said arm.

J. ARMAND BOMBARDIER.

REFERENCES CITED

The following references are of record in the file of this patent:

UNITED STATES PATENTS

| Number | Name | Date |
|---|---|---|
| 1,246,097 | Hobson | Nov. 13, 1917 |
| 1,268,116 | Harger | June 4, 1918 |
| 1,451,627 | Munson | Apr. 10, 1923 |